(12) United States Patent
Fujibayashi et al.

(10) Patent No.: US 6,808,868 B2
(45) Date of Patent: Oct. 26, 2004

(54) METHOD FOR MANUFACTURING A SUBSTRATE FOR A DISPLAY PANEL

(75) Inventors: Sadayasu Fujibayashi, Kumagaya (JP); Tetsuya Iizuka, Saitama (JP); Kouhei Nagayama, Sagamihara (JP)

(73) Assignee: Toshiba Matsushita Display Technology Co., Ltd, Tokyo (JP)

( * ) Notice: Subject to any disclaimer, the term of this patent is extended or adjusted under 35 U.S.C. 154(b) by 0 days.

(21) Appl. No.: 10/737,852

(22) Filed: Dec. 18, 2003

(65) Prior Publication Data

US 2004/0126706 A1 Jul. 1, 2004

(30) Foreign Application Priority Data

Dec. 24, 2002 (JP) ........................................ 2002-372621

(51) Int. Cl.$^7$ ................................................. G02F 1/13
(52) U.S. Cl. ........................ 430/321; 430/315; 430/319; 430/396
(58) Field of Search ................................. 430/321, 319, 430/315, 396; 349/113

(56) References Cited

FOREIGN PATENT DOCUMENTS

| JP | 2000-258762 A | * | 9/2000 |
| JP | 2000-284272 A | * | 10/2000 |

* cited by examiner

*Primary Examiner*—John A. McPherson
(74) *Attorney, Agent, or Firm*—Oblon, Spivak, McClelland, Maier & Neustadt, P.C.

(57) ABSTRACT

A manufacturing method of a substrate for display panel comprises a step of forming an organic insulating film on a light transmissive substrate and a step of patterning the organic insulating film to form a first opening and a second opening smaller than the first opening formed as through holes therein. In particular, this patterning step includes a lithography process of selectively exposing the organic insulating film to light with the use of a photomask and removing the light-exposed portions, the photomask being so set that the average light transmittance is lower at a light transmissive area for the first opening than at a light transmissive area for the second opening.

16 Claims, 10 Drawing Sheets

METHOD FOR MANUFACTURING A SUBSTRATE FOR A DISPLAY PANEL

CROSS-REFERENCE TO RELATED APPLICATIONS

This application is based upon and claims the benefit of priority from the prior Japanese Patent Application No. 2002-372621, filed Dec. 24, 2002, the entire contents of which are incorporated herein by reference.

BACKGROUND OF THE INVENTION

1. Field of the Invention

The present invention relates to a method for manufacturing a substrate for a display panel which is used, for example, in manufacture of a liquid crystal display panel and, in particular, to a method for manufacturing a display panel applied to a light transmissive substrate including an organic insulating film stacked thereon and having a plurality of openings of different sizes.

2. Description of the Related Art

A liquid crystal display device is used in an apparatus, such as a personal computer, TV, word processor and hand-held telephone. In such apparatuses, a growing demand is now being made for achieving a compact, power saving, lower cost, etc., unit further including more functions. In order to satisfy such demand, a reflective type liquid crystal display device using ambient light as a light source as well as a semi-transmissive type liquid crystal display device using both backlight and ambient light as a light source is now under development.

For example, the semi-transmissive type liquid crystal device, like the transmissive type, has a display panel having a structure with a liquid crystal layer held between an array substrate and a counter substrate. Generally, the array substrate includes a matrix-like array of pixel electrodes and a corresponding array of switching elements connected to these pixel electrodes, while, on the other hand, the counter substrate includes a single counter electrode opposite to the array of pixel electrodes. Here, each pixel electrode has, for example, a reflective electrode section and a transmissive electrode section formed as a light transmissive window surrounded with the reflective electrode section. The reflective electrode section reflects, as reflecting light, ambient light incident via a liquid crystal layer from the counter substrate side, while, on the other hand, the transmissive electrode section transmits, as transmitting light, backlight incident from the array substrate side. In such a system, the difference in height between the reflective electrode section and the transmissive electrode section is set such that the LC layer thickness above the transmissive electrode section is about two times that above the reflective electrode section. By doing so, the optical condition is optimized relative to the reflecting light and transmitting light and it is possible to reduce a loss both in reflectivity and in transmittance.

In the manufacture of the array substrate, a thin-film transistor is formed as the switching element at a transparent insulating substrate such as a glass substrate and, after this, an organic insulating film is formed to cover the switching element therewith. Further, selective patterning is done to provide a first opening for receiving the transmissive electrode and a second opening acting as a switching element's contact hole. And the first and second openings are formed by a photolithography process of exposing the organic insulating film to light with the use of a photomask having a planar pattern shown in FIG. 22 and selectively removing the exposed-light portions. After this process, a transparent conduction film such as ITO is sputtered to cover the organic insulating film and first and second openings and patterning is effected to obtain pixel electrode shapes. By doing so, the transparent conduction film contacts the switching element in the second opening. After this, sputtering is done to cover the transparent conduction film with the reflective conduction film made of a metal. And patterning is done to obtain a reflective electrode shape with the transparent conduction film exposed in the first opening. The reflective electrode section is obtained by the reflective conduction film covering the transparent conduction film around the first opening while, on the other hand, the transmissive electrode section is obtained by the transparent conduction film exposed in the first opening. Therefore, the difference in height between the transmissive electrode section and the reflective electrode section is set generally dependent upon the thickness of the organic insulating film.

Incidentally, the second opening serving as a contact hole is smaller than the first opening for receiving the transmissive electrode section. In the light exposure of the organic insulating film using the photomask shown in FIG. 22, therefore, an inadequate light exposure is liable to occur at the light exposure section for the second opening. The amount of light applied to the organic insulating film may be increased to make a contact hole in the film without fail. In this case, too much light is applied to the exposure part for the first opening. Consequently, the first opening is adversely affected by the surface condition of the light exposure machine's stage on which the array substrate having the switching element formed on the transparent insulating substrate and covered with the organic insulating film is placed. That is, in the light exposure machine's stage there are many holes, such as pin insertion holes for lifting the array substrate, vacuum holes for sucking the array substrate, etc. At places other than the pin insertion holes and vacuum holes, the organic insulating film undergoes a double light exposure by the light which, after passing through the array substrate as shown in FIG. 23, is reflected on the surface of the light exposure machine's stage. As a result, the first opening is formed to have a size of L1 shown in FIG. 24, while, on the other hand, in those areas where pin insertion holes and vacuum holes are present, the light passing through the array substrate as shown in FIG. 25 is not reflected on the surface of the light exposure machine's stage and, therefore, the first opening is formed to have a size of L2 smaller than the size of L1. Such a size variation of the first opening causes an uneven stage mark to be appeared in a reflected-light display image, thus prominently lowering a quality of display.

This stage mark can be alleviated by suppressing an increase in amount of light transmitted through the photomask. It is, however, difficult to form contact holes with high reliability. There arises the problem that the number of defective pixels in the display screen increases due to contact failures in the contact holes. If larger contact holes are initially formed, then it is not necessary to excessively increase the amount of light from a light source. However, this also decreases the effective area of the reflective electrode section. Thus, it is not possible to maintain a high reflectivity.

BRIEF SUMMARY OF THE INVENTION

The present invention has been made to overcome the above-mentioned problems, and it is accordingly an object of the present invention to provide a method for manufacturing a substrate for a display panel which can obtain a uniform and excellent display quality without increasing the number of defective pixels.

According to one aspect of the present invention, there is provided a method for manufacturing a substrate for display panel, comprising a step of forming an organic insulating film on a light transmissive substrate and a step of patterning the organic insulating film to form a first opening and a second opening smaller than the first opening as through holes in the organic insulating film, wherein the patterning step comprises a photolithography process of selectively exposing the organic insulating film to light with the use of a photomask and removing the light-exposed portions, the photomask being so set that the average light transmittance is lower at a light transmissive area for the first opening than at a light transmissive area for the second opening area.

In this manufacturing method, the organic insulating film on the light transmissive substrate is selectively exposed to light to form the first opening and the second opening smaller than the first opening. This exposure is effected with use of the photomask whose average light transmittance is so set as to be lower at the light transmissive area for the first opening than at the light transmissive area for the second opening. Thus, a light exposure amount for the first opening and that for the second opening can be respectively optimized through the utilization of their average light transmittance difference. Ever if an amount of light from the light source is increased to reliably form the second opening as a through hole in the organic insulating film, the amount of light applied to the organic insulating film is set to be weaker at the light transmissive area for the first opening than at the light transmissive area for the second opening. Therefore, even if the light reaches, through the light transmissive substrate, the surface of the light exposure machine's stage on which the substrate is placed, there never occurs any prominent variation in size of the first opening resulting from the presence/absence of light reflection depending upon the surface condition of the light exposure machine's stage. It is, therefore, possible to obtain a uniform and excellent display quality without increasing the number of defective pixels.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

With reference to the accompanying drawing, an explanation will be made below about a semi-transmissive type liquid crystal display device according to one embodiment of the present invention.

Figure 1:
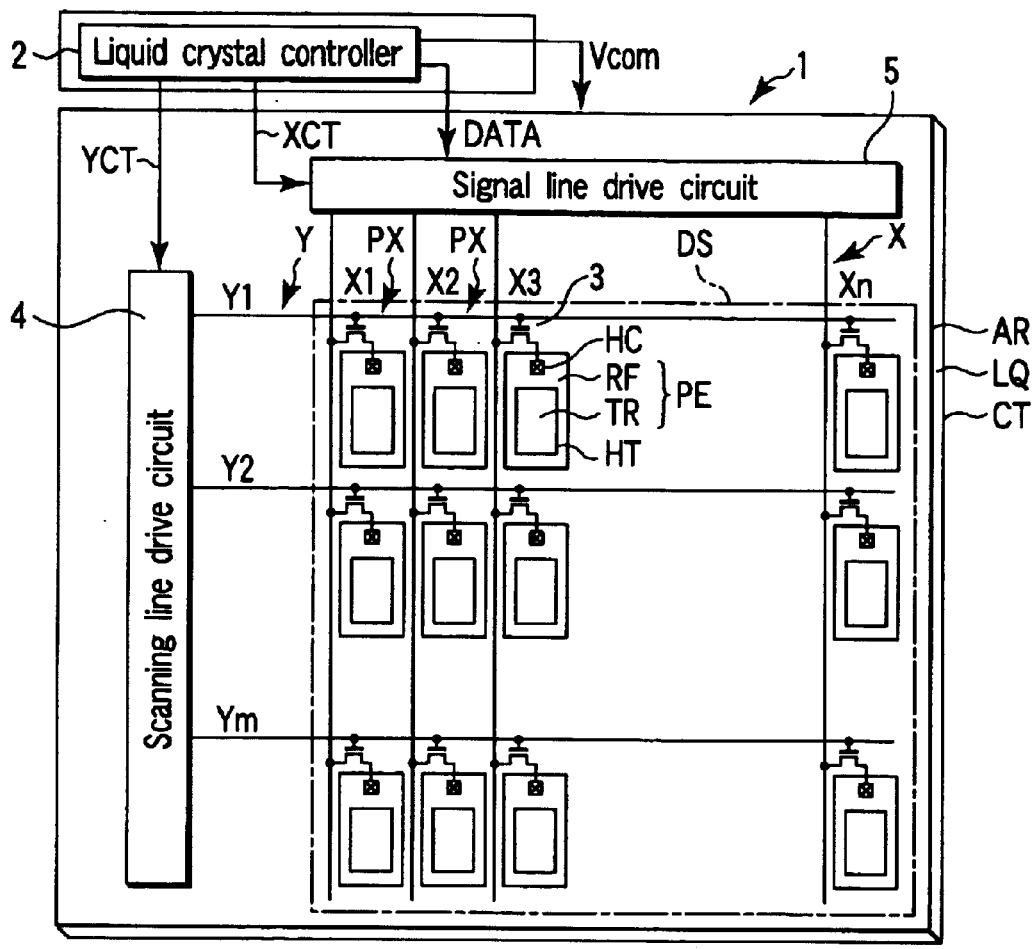
FIG. 1 is a view schematically showing a circuit arrangement of a semi-transmissive type liquid crystal display device according to a first embodiment of the present invention.
Figure 2:
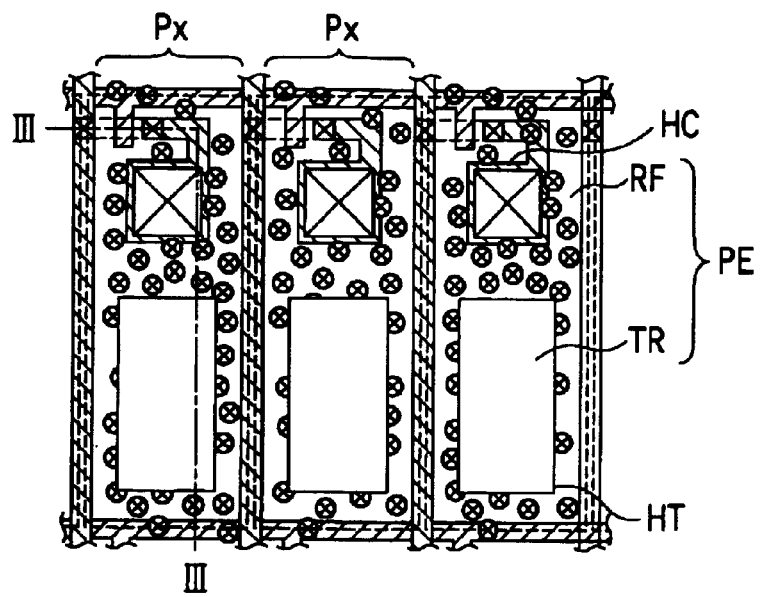
FIG. 2 is a view showing a planar structure including a pixel shown in FIG. 1.
Figure 3:
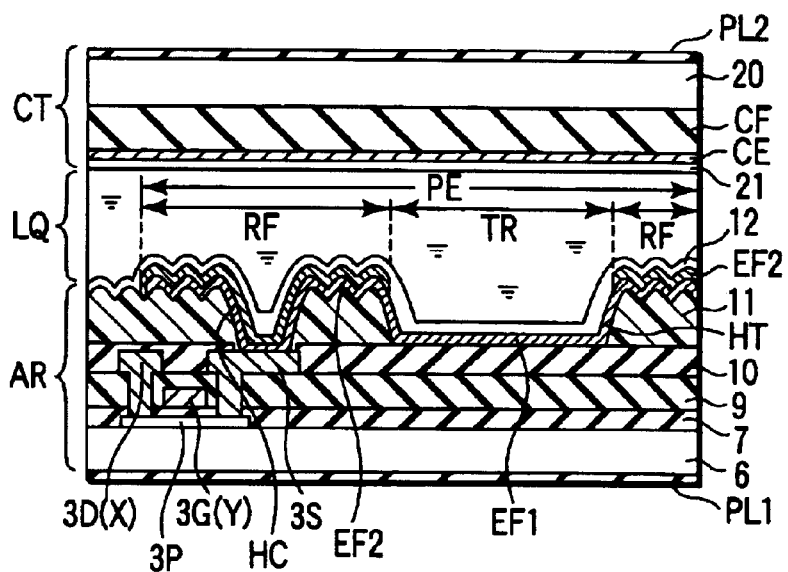
FIG. 3 is a view showing a cross-sectional structure of the portion including the pixel shown in FIG. 2.

FIG. 1 shows a circuit arrangement schematically showing the semi-transmissive type liquid crystal display device. FIG. 2 shows a planar structure including a pixel shown in FIG. 2. FIG. 3 shows a cross-sectional structure including the pixel shown in FIG. 2. This liquid crystal display device has, as shown in FIG. 1, a liquid crystal display panel 1 and a liquid crystal controller 2 for controlling the liquid crystal display panel 1. In the liquid crystal display panel 1, for example, a liquid crystal layer LQ is so structured as to be held between an array substrate AR and a counter substrate CT. The liquid crystal controller 2 is arranged on a drive circuit board independent of the liquid crystal panel 1.

The array substrate AR includes an m×n number of pixel electrodes PE arranged as a matrix array, an m number of scanning lines Y(Y1 to Ym) formed along rows of the pixel electrodes PE, an n number of signal lines X (X1 to Xn) formed along columns of the pixel electrodes PE, an m×n number of pixel switching elements 3 arranged near intersections between the signal lines X1 to Xn and the scanning lines Y1 to Ym, a scanning line drive circuit 4 for driving the scanning lines Y1 to Ym and a signal line drive circuit 5 for driving the signal lines X1 to Xn. Each of the pixel electrodes is set to have a size of, for example, 110 $\mu$m×330$\mu$.

The counter substrate CT includes a single counter-electrode CE arranged opposite to the m×n number of pixel electrodes PE and set to a common potential Vcom.

The liquid crystal controller 2 receives an external digital video signal and synchronizing signal and generates a digital video signal DATA, vertical scanning control signal YCT and horizontal scanning control signal XCT. The vertical scanning control signal YCT is sent to the scanning line drive circuit 4 and the horizontal scanning control signal XCT, together with the digital video signal DATA, is sent to the signal line drive circuit 5. The scanning line drive circuit 4 is so controlled by the vertical scanning control signal YCT as to sequentially supply a scanning signal to the scanning lines Y1 to Ym in each vertical scanning (frame) period. The signal line drive circuit 5 is so controlled as to allow the digital video signal DATA which is inputted during one horizontal scanning period (1H), that is, a period in which one of the scanning lines Y is driven by the scanning signal, to be series-parallel converted and allow an analog video signal which is obtained through a digital-to-analog conversion to be supplied to the signal lines X1 to Xn.

In the liquid crystal display device, the liquid crystal layer LQ is divided into an m×n number of pixels PX corresponding to the m×n number of pixel electrodes PE. A display screen DS shown in FIG. 1 is comprised of the m×n number of pixels PX. Each of the pixel switching elements 3 samples an analog video signal from a corresponding signal line X and applies it to the corresponding pixel electrode PE, so that the light transmittance of the corresponding pixel PX is controlled based on a potential difference between the potential of the pixel electrode PE and that of the counter electrode CE.

In the array substrate AR, each pixel switching element 3 is comprised of, for example, an N channel thin film transistor arranged as shown in FIG. 2. This transistor has, as shown in FIG. 3, a polysilicon semiconductor layer 3P formed on a transparent insulating substrate 6 such as a glass substrate, a gate electrode 3G formed over the semiconductor layer 3P with a gate insulating layer 7 therebetween, and source and drain electrodes 3S and 3D connected to the semiconductor layer 3P on both sides of the gate electrode 3G. On the gate insulating film 7, the gate electrode 3G is formed integral with the scanning line Y. The gate electrode 3G and scanning line Y, together with the gate insulating film 7, are covered with an interlayer insulator 9. The source electrode 3S and drain electrode 3D are formed on the interlayer insulator 9 and make contact with the semiconductor layer 3P via a contact hole formed as through hole in the interlayer insulator 9 and gate insulating film 7. On the interlayer insulator 9, the drain electrode 3D is formed integral with the corresponding signal line X. The source electrode 3S, drain electrode 3D and signal line X, together with the interlayer insulator 9, are covered with a protective inorganic insulating film 10. The protective inorganic insulating film 10 is covered with an organic insulating film 11 such as a positive type photosensitive resin film.

The pixel electrode PE has a reflective electrode section RF and a transmissive electrode section TR formed as a light transmissive window surrounded with the reflective electrode section RF. The reflective electrode section RF reflects, as reflection light, ambient light incident from the counter substrate CT side through the liquid crystal layer LQ. The transmissive electrode section RF allows backlight which is incident from the array substrate AR side to be transmitted as transmitting light. In more detail, the organic insulating film 11 has a first opening HT of 50 $\mu$m×130 $\mu$m receiving the transmissive electrode section RF and a second opening HC of 11 $\mu$m×11 $\mu$m providing a contact hole between the source electrode 3S of the pixel switching element 3 and the reflective electrode section RF. The first opening HT and second opening HC are provided as through holes in the organic insulating film 11 by a photolithography process of exposing the organic insulating film 11 to light with the use of a photomask MK of a planar pattern as shown, for example, in FIG. 4 and selectively removing the light-exposed portions. The inorganic insulating film 10 exposed in the first opening HT, as well as the source electrode 3S of the switching element 3 and organic insulating film 11 exposed in the second opening HC, is covered with a transparent conduction film EF1 such as ITO. The transparent conduction film EF1 is covered, except in the first opening HT, with a reflective conduction film EF2 formed of a metal. The reflective electrode section RF is obtained by the reflective conduction film EF2 covering the transparent conduction film EF1 around the first opening HT while, on the other hand, the transmissive electrode section TR is obtained by the transparent conduction film EF1 exposed in the first opening HT.

Further, a plurality of semi-spherical bumps are randomly arranged on the surface of the organic insulating film 11 beneath the reflective electrode section RF. The reflective electrode section RF allows reflecting light to be scattered in various directions due to undulations corresponding to these randomly arranged semi-spherical bumps. The pixel electrode PE is covered with an alignment film 12.

In the counter substrate CT, red, green and blue stripe-like color filters CF are so formed on a transparent insulating substrate, such as a glass substrate, as to be sequentially arranged in a row direction facing the pixel electrode PE on the corresponding column. Further, an alignment film 21 is so formed as to cover the counter electrode CE.

The alignment axes of the alignment films 12 and 21 are set to be shifted, by a rubbing process, at an angle of, for example, 70° with respect to each other. The array substrate AR and counter substrate CT are bounded by an outer-edge sealing member to each other with the alignment films 12 and 21 inside. The liquid crystal layer LQ is obtained by, after so bonding the array substrate AR and counter substrate CT, supplying a nematic liquid crystal material via a liquid crystal filling port of the outer-edge sealing member and sealing the filling port by a sealing member. The nematic liquid crystal material has, for example, a positive anisotropic dielectric constant and is aligned in a twisted array between the array substrate AR and the counter substrate CT. The difference in height between the transmissive electrode section TR and the reflective electrode section RF depends upon the thickness of the organic insulating film 11. The thickness of the liquid crystal layer LQ is so set as to have, above the transmissive electrode section TR, about two times the thickness defined above the reflective electrode section RF. A polarizing plate PL1 is bonded to the array substrate AR on a side opposite to the alignment film 12 and a polarizing plate PL2 is bonded to the counter substrate CT on a side opposite to the alignment film 21.

Here, a detailed explanation will be made below about the method for manufacturing the array substrate of the above-mentioned liquid crystal display panel 1.

FIGS. 5 to 13 show the steps of manufacturing the array substrate for use in the liquid crystal display panel 1. In the manufacturing step shown in FIG. 5, the polysilicon semiconductor film 3P, gate insulating film 7 and gate electrode 3G are formed over the transparent insulating substrate 6. An impurity is doped into a source formation region 3SP and drain formation region 3DP to provide a thin-film transistor serving as the switching element 3.

Figure 6:
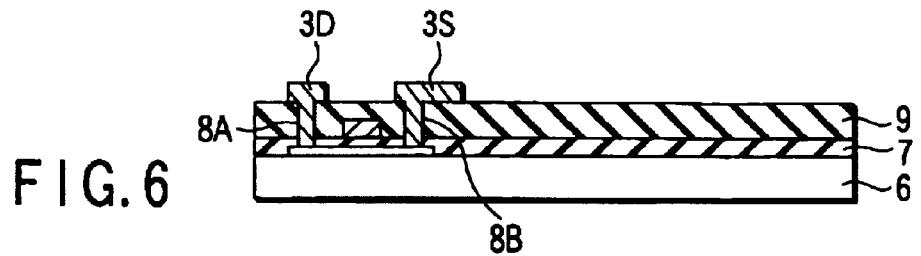
FIG. 6 is a cross-sectional view showing the step of manufacturing the array substrate, following the step shown in FIG. 5.

In the manufacturing step shown in FIG. 6, the interlayer insulator 9 is formed and then contact holes 8A, 8B are formed by etching. Then, a metal film is formed by sputtering, etc., and a resultant structure is etched to provide the drain electrode 3D making contact with the drain region 3DP through the contact hole 8A, the source electrode 3S making contact with the source region 3SP through the contact hole 8B and the signal line X integral with the source electrode 3S.

Figure 7:
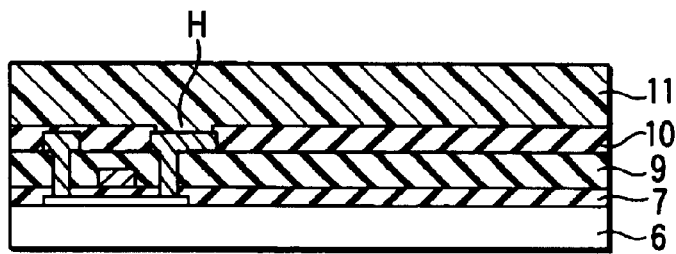
FIG. 7 is a cross-sectional view showing the step of manufacturing the array substrate, following the step shown in FIG. 6.

In the manufacturing step shown in FIG. 7, the transparent protective inorganic insulating film 10 is formed, and an opening H is formed to partially expose the source electrode 3S of the pixel switching element 3. After this, a positive type photosensitive resin is spin-coated, etc., as an organic insulating film 11 on a whole surface of the protective inorganic insulating film 10 to a thickness of about 1 μm to 4 μm, for example, 3.6 μm.

Then, a light transmissive substrate structure including the transparent insulating substrate 6, gate insulating film 7, interlayer insulator 8 and protective inorganic insulating film 10, together with the organic insulating film 11 stacked thereon, are pre-baked and, after this, the organic insulating film 11 is patterned in the process shown in FIGS. 8 to 11. In the patterning process, the photolithography process is performed with a photomask MK shown in FIGS. 4 and 8 to provide the first opening HT and second opening HC as through holes in the organic insulating film 11 as shown in FIG. 3.

Figure 8:
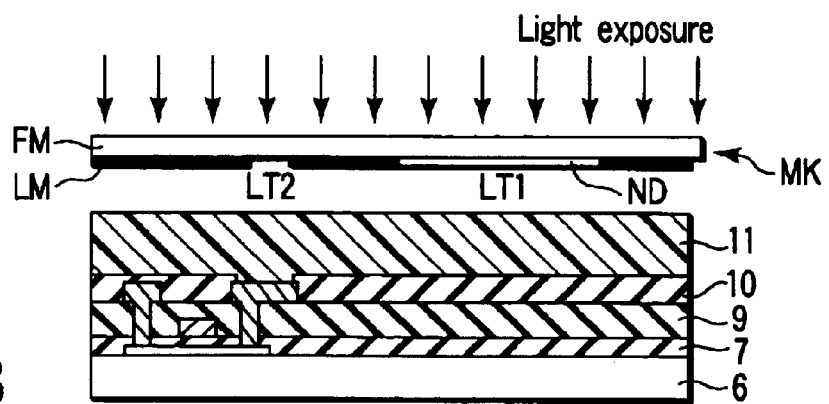
FIG. 8 is a cross-sectional view showing the step of manufacturing the array substrate, following the step shown in FIG. 7.

In the manufacturing step shown in FIG. 8, light exposure processing is made with the use of the photomask MK to selectively expose the organic insulating film 11 to light. The photomask is provided by printing a light shielding film LM formed of chromium (Cr), etc., on a transparent support plate FM and forming a light transmissive area LT1 for the opening HT and light transmissive area LT2 for the opening LT2 for the opening HC in the light shielding film LM. The average light transmittance is set to be lower at the light transmissive area LT1 than at the light transmissive area LT2. In more detail, the light transmissive area LT1 is obtained by a light reducing film ND such as a colored resin received in the first light transmissive hole in the light shielding film LM and the light transmissive area LT2 is obtained by the second light transmissive hole in the light shielding film LM. The second light transmissive hole allows light incident from the transmissive support plate FM side to be uniformly passed at a rate of 100%, while, on the other hand, the light reducing film ND allows light incident from the transparent support plate FM side to be passed at a rate of less than 100%. In order to reliably form the openings HT and HC as through holes in the organic insulating film 11, the light exposure amount in the light exposure process is set to 300 to 500 mJ/cm$^2$ at which light from a light source is transmitted through the photomask MK at a 100% light transmittance.

Figure 9:
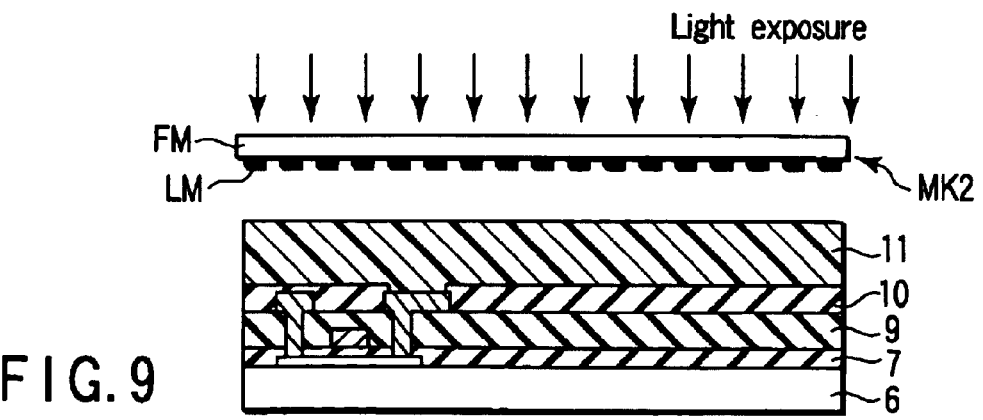
FIG. 9 is a cross-sectional view showing the step of manufacturing the array substrate, following the step shown in FIG. 8.
Figure 10:
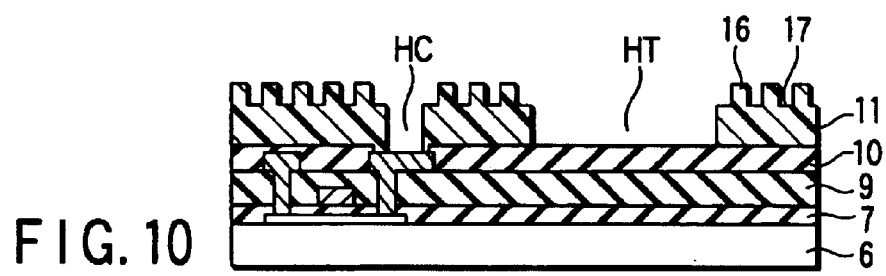
FIG. 10 is a cross-sectional view showing the step of manufacturing the array substrate, following the step shown in FIG. 9.

In the manufacturing step shown in FIG. 9, the light exposure process is performed to selectively make light exposure as a half light exposure relative to the organic insulating film 11 with the use of a photomask MK2. The photomask MK2 is obtained by printing a light shielding film LM such as chromium (Cr) as a plurality of circular dots on a transparent support FM and forming a light transmissive area to secure a 100% light transmittance around these circular dots. In this light exposure process, a light exposure is made only on a surface portion of the organic insulting film 11 and the light exposure amount is set to 10 to 200 mJ/cm$^2$ at which light from a light source passes through the photomask MK at a 100% light transmittance. In the manufacturing step shown in FIG. 10, the light exposure section is developed to provide the openings HT and HC as through holes in the organic insulating film 11 as well as bump and recess areas 16 and 17 for the undulations in the organic insulating film 11. The bump areas 16 are so formed as to correspond to the light shielding film LM as circular dots while, on the other hand, the recess area 17 is so formed as to correspond to the light transmissive area around the circular dots. In the light exposure process using the photomask MK2, the light exposure amount is set to about 10 to 200 mJ/cm$^2$ and, therefore, the bottom of the recess area 17 never reaches the surface of the protective inorganic insulating film 10 past the organic insulating film 11.

Figure 11:
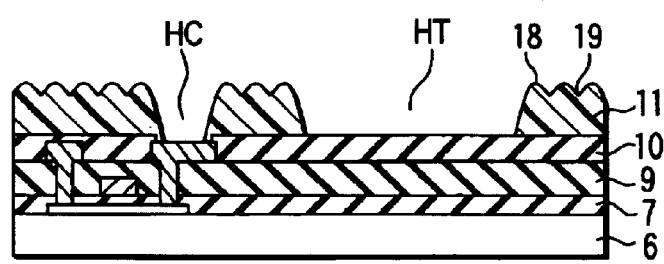
FIG. 11 is a cross-sectional view showing the step of manufacturing the array substrate, following the step shown in FIG. 10.

In the manufacturing step shown in FIG. 11, the light transmissive substrate, together with the organic insulating film 11, is heat-treated. During this treatment, angular parts of the bump and recess areas 16 and 17 are removed to provide a smoother semi-spherical convex area 18 and a smoother concave area 19 surrounding the semi-spherical convex area 18. When the photolithography process is so done, the thickness of the organic insulating film 11 which has been 3.6 μm at a coating time is reduced to about 2.0 μm.

Figure 12:
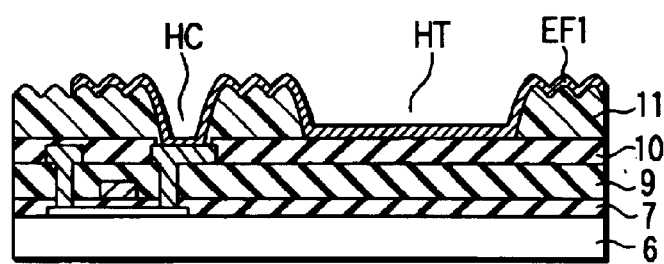
FIG. 12 is a cross-sectional view showing the step of manufacturing the array substrate, following the step shown in FIG. 11.

Then, in the manufacturing step shown in FIG. 12, for example, ITO is deposited by sputtering to allow the organic insulating film 11 to be covered therewith to a thickness of about 100 nm. This structure is patterned by the photoetching method to a pixel electrode configuration to provide the protective inorganic insulating film 10 exposed in the opening HT, the source electrode 3S exposed in the opening HC and the transparent conduction film EF1 on the organic insulating film 11. Around the openings HT and HC, the transparent conduction film EF1 has an undulations corresponding to the undulations in the surface of the organic insulating film 11.

Figure 13:
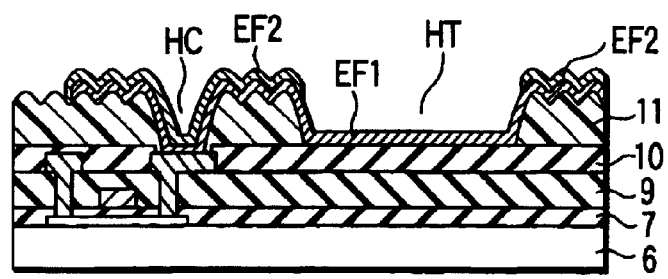
FIG. 13 is a cross-sectional view showing the step of manufacturing the array substrate, following the step shown in FIG. 12.

In the manufacturing step shown in FIG. 13, the reflective conduction film EF2 is provided so as to cover the transparent conduction film EF1 except in the opening HT. That is, a metal such as Al, Ni, Cr, Ag, etc., is deposited by a sputtering method to a thickness of about 100 nm. A resultant structure is patterned by a photoetching method to a reflective electrode shape that exposes the transparent conduction film EF1 in the opening HT. The reflective electrode section RF is provided as the reflective conduction film EF2 covering the transparent conduction film EF1 around the opening HT. On the other hand, the transmissive electrode section TR is provided as the transparent conduction film EF1 exposed in the opening HT. Around the openings HT and HC, the reflective conduction film EF2 has undulations corresponding to those of the organic insulating film 11 and transmissive conduction film EF1. The alignment film 12 is formed to cover the pixel electrode PE comprised of the reflective electrode section RF and transmissive electrode section TR. The array substrate AR is formed as set out above.

In the present embodiment, the organic insulating film 11 on the light transmissive substrate structure including the transparent insulating substrate 6, gate insulating film 7, interlayer insulator 8 and protective inorganic insulating film 10 is selectively exposed to light to provide the opening HT and opening HC smaller than the opening HT. This exposure is effected with use of the photomask MK whose average light transmittance is so set as to be lower at the light transmissive area LT1 for the first opening HT than at the light transmissive area LT2 for the second opening HC. Thus, the light exposure amount for the opening HT and that for the opening HC can be optimized through the utilization of their average light transmittance difference. In this case, even if the light amount of the light source is increased so as to reliably form the opening HC as a through hole in the organic insulating film 11, the light applied from the light source to the organic insulating film 11 is made weaker at the light transmissive area LT1 than at the light transmissive area LT2. Even if, therefore, the applied light reaches, past the light transmissive substrate structure, the surface of the light exposure machine's stage on which the substrate is placed, there never occurs any greater variation in size of the opening HT resulting from the presence and absence of light reflection dependent upon the surface condition of the light exposure machine's stage. By doing so, it is possible to obtain a uniform and excellent display quality without increasing the number of defective pixels.

Figure 4:
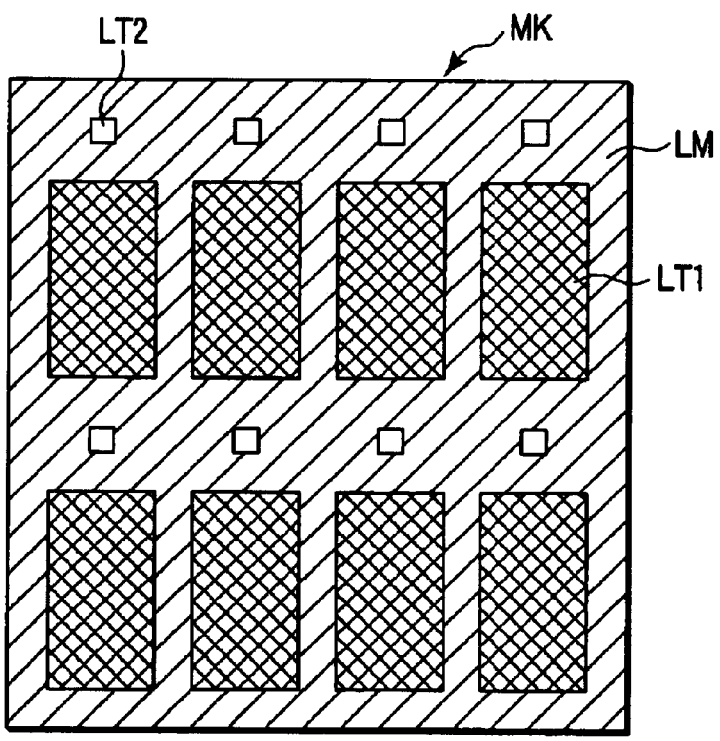
FIG. 4 is a view showing a planar pattern of a photomask for use in a photolithography process of forming first and second openings as through holes in an organic insulating film shown in FIG. 3.
Figure 5:
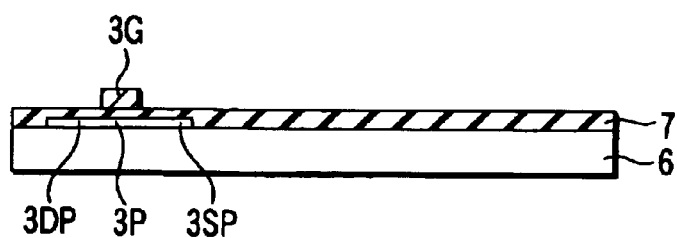
FIG. 5 is a cross-sectional view showing a step of manufacturing an array substrate for use in a liquid crystal panel shown in FIG. 1.
Figure 14:
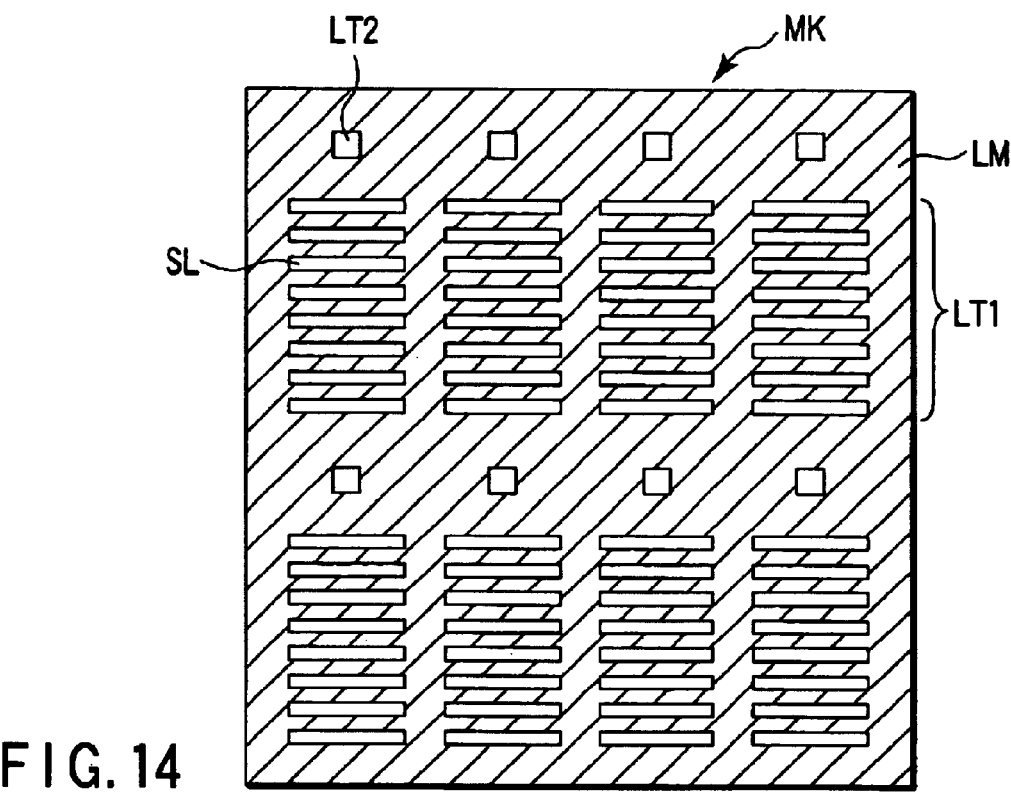
FIG. 14 is a view showing a first modification of the photomask shown in FIG. 4.

FIG. 14 shows a first modification of the photomask MK shown in FIG. 4. In this modification, a plurality of light transmissive holes are uniformly arranged in the corresponding light transmissive area LT1 for the opening HT and, by doing so, the light transmissive area LT1 is so set as to have a partially different light transmittance. In more detail, as shown in FIG. 14, these light transmissive holes are formed as a parallel array of straight slits SL in the light shielding film LM. These straight slits SL, each, have a width of 3 μm and are arranged at an interval of 6 μm in a longitudinal direction of the pixel electrode PE.

According to the photomask MK of the first modification, it is not necessary to provide any light reducing film ND shown in FIG. 4 and it is possible to form the photomask MK shown in FIG. 14 in the same process as in the prior art. It is, therefore, possible to suppress the manufacturing cost to a lower level in comparison with the case where the photomask MK shown in FIG. 4 is utilized.

Figure 15:
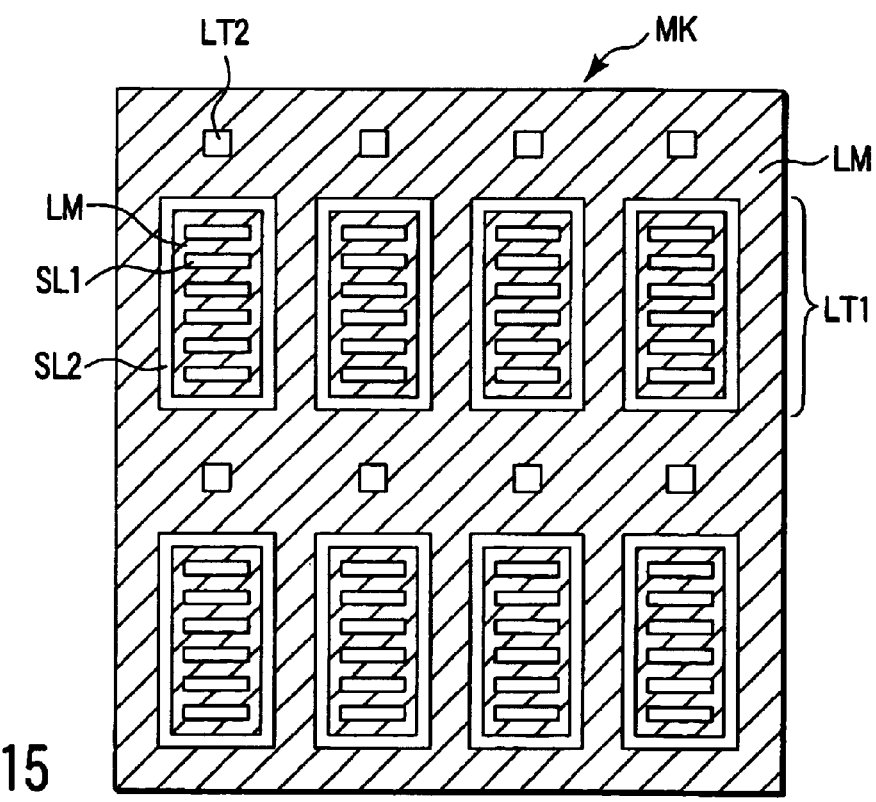
FIG. 15 is a view showing a second modification of the photomask shown in FIG. 4.

FIG. 15 shows a second modification of the photomask MK shown in FIG. 4. In this modification, a plurality of light transmissive holes are uniformly arranged in the light transmissive area LT1 for the opening HT as in the case of the first modification. In this structure, the light transmissive area LT1 is so set as to have a partially different light transmittance. However, these light transmissive holes are formed, in the light shielding film LM, as a parallel array of straight slits SL1 and a single rectangular slit SL2 surrounding these straight slits SL1 therewith as shown in FIG. 15. The straight slits SL1, each, have a width of 3 am and are arranged at an interval of 6 μm in a longitudinal direction of the pixel electrode PE. The rectangular slits SL2, each, have a width of 3 μm and are spaced by 6 μm away from these straight slits SL1.

Incedentally, in the first modification, the opening HT is liable to be formed in such a state as to project outwardly near each end of the slit SL structure but recede inwardly near each end of the light shielding section constituting the light shielding film LM relative to the slits. Therefore, there is a risk that the liquid crystal alignment will be disturbed.

According to the photomask MK of the second modification, the single rectangular slit SL2 is formed in the light shielding film LM to surround the straight slits SL1 therewith and it is possible to reduce a liquid crystal alignment failure by making the outer edge of the opening HT straight.

Figure 16:
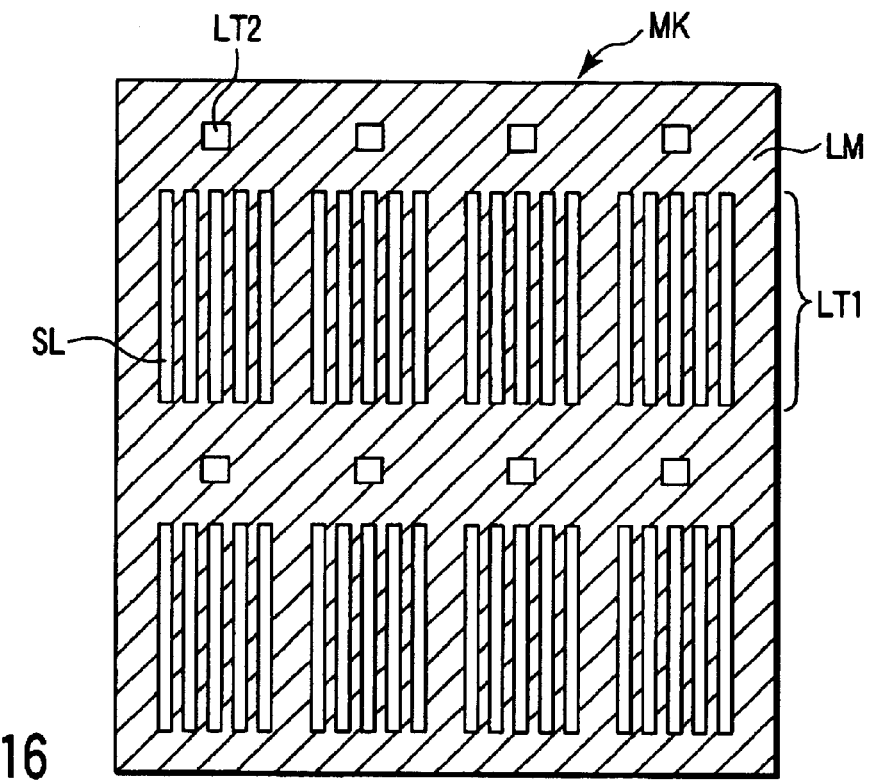
FIG. 16 is a view showing a third modification of the photomask shown in FIG. 4.

FIG. 16 shows a third modification of the photomask MK shown in FIG. 4. In this modification, a plurality of light transmissive holes are uniformly arranged in the light transmissive area LT1 for the opening HT as in the case of the first modification. By doing so, the light transmissive area LT1 is so set as to have a partially different light transmittance. Further, these light transmissive holes are formed as a parallel array of straight slits SL in the light shielding film LM as in the case of the first modification. The straight slits SL, each, have a width of 3 μm each but are arranged at an interval of 6 μm in a shorter side direction of the pixel electrode PE.

According to the photomask MK of the third modification, it is possible to obtain, in addition to the same advantage as in the first modification, also an advantage of somewhat reducing the range in which the outer edge of the opening HT is not made straight.

Figure 17:
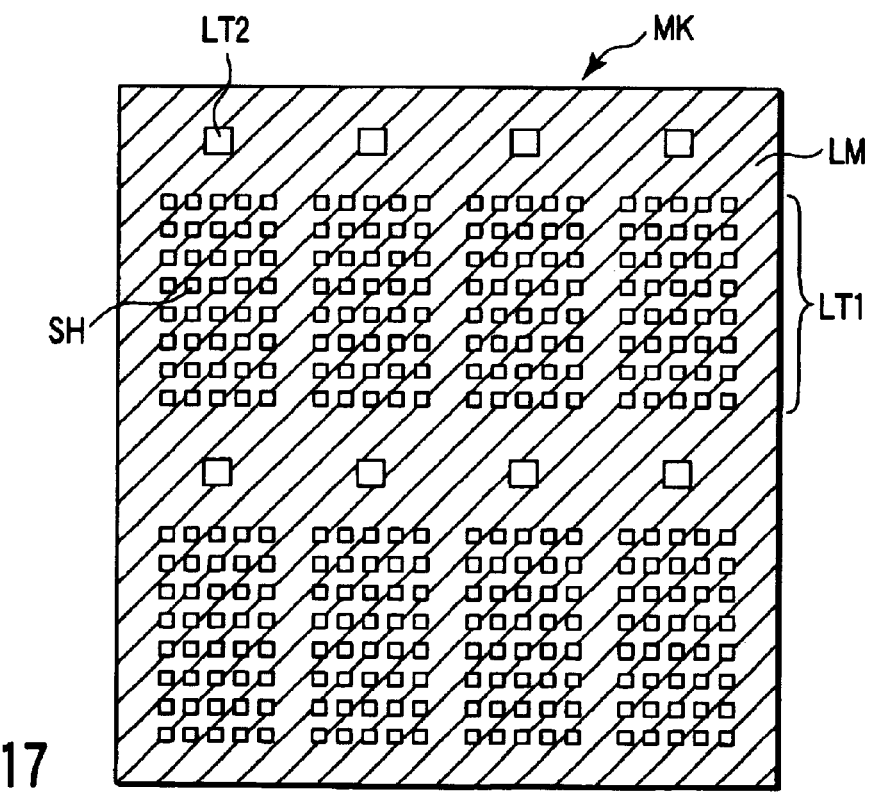
FIG. 17 is a view showing a fourth modification of the photomask shown in FIG. 4.

FIG. 17 shows a fourth modification of the photomask MK shown in FIG. 4. In the modification, a plurality of light transmissive holes are uniformly arranged in the light transmissive area LT1 for the opening HT in the same way as in the first modification. By doing so, the light transmissive area LT1 is so set as to have a partially different light transmittance. These light transmissive holes are formed as rectangular holes SH in the light shielding film LM, not as the straight slits SL in the first modification. These rectangular holes SH, each, have a size of 3 μm×3 μm and are mutually arranged at an interval of 6 μm as a matrix array.

According to the photomask MK of the fourth modification, it is not necessary to provide the light reducing film ND shown in FIG. 4 as in the case of the first modification and it is possible to form the photomask MK shown in FIG. 17 as in the same process as in a conventional process. As a result, the manufacturing cost can be suppressed to a lower level than in the case where the photomask MK is utilized.

Figure 18:
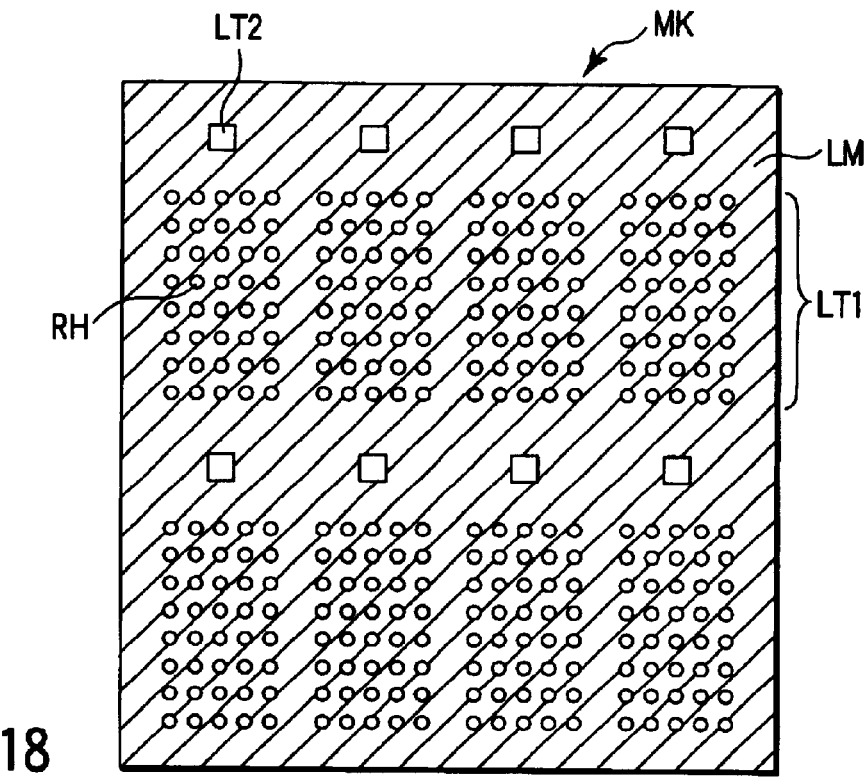
FIG. 18 is a view showing a fifth modification of the photomask shown in FIG. 4.

FIG. 18 shows a fifth modification of the photomask MK shown in FIG. 4. In this modification, a plurality of light transmissive holes are uniformly arranged in the light transmissive area LT1 for the opening HT as in the case of the fourth modification and the light transmissive area LT1 is so set as to have a partially different light transmittance. These light transmissive holes are formed as circular holes RH, such as true circular or elliptical ones, in the light shielding film LM, not as a rectangular holes shown in the fourth modification, and arranged as a matrix array.

According to the photomask MK of the fifth modification, it is possible to obtain an advantage similar to that of the fourth modification.

Figure 19:
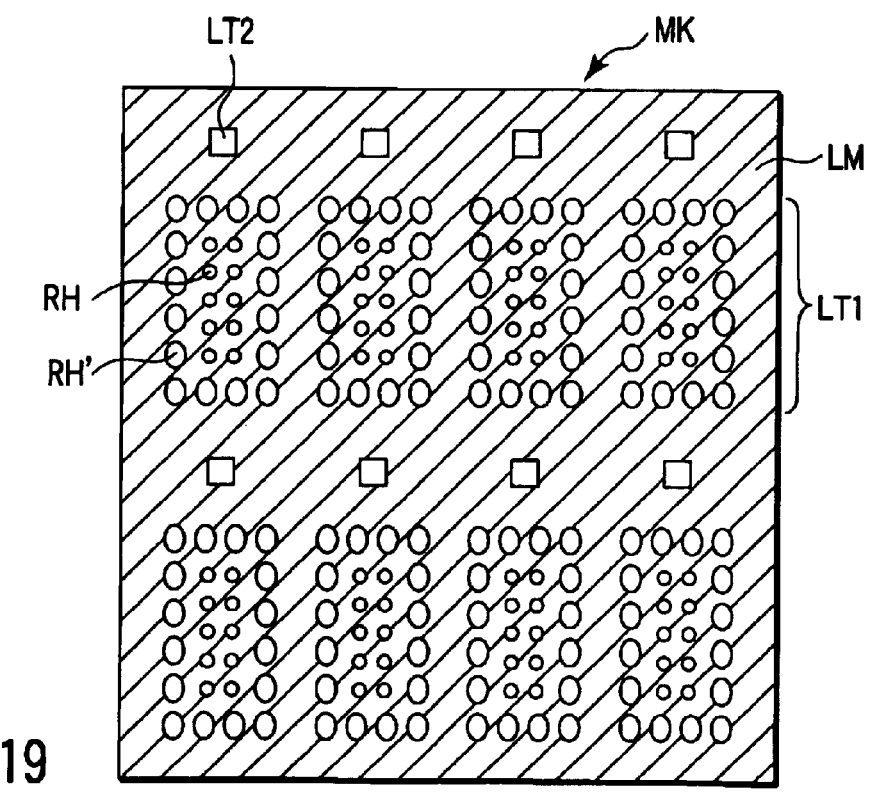
FIG. 19 is a view showing a sixth modification of the photomask shown in FIG. 4.

FIG. 19 shows a sixth modification of the photomask MK shown in FIG. 4. In this modification, as in the case of the fourth modification, a plurality of light transmissive holes are uniformly arranged in the light transmissive area LT1 for the opening HT. By doing so, the light transmissive area LT1 is so set as to have a partially different light transmittance. However, these light transmissive holes are formed, in the light shielding film LM, as a plurality of circular holes RH and an outermost array of circular holes, RH', surrounding these circular holes RH therewith as shown in FIG. 19 and are arranged as a matrix array. The outermost array of circular holes, RH', is so formed that each in the outermost array of circular holes, RH', is larger than circular holes RH surrounded as inside circular holes with the outermost array of circular holes RH'.

In the fourth and fifth modifications, the hole HT is liable to be formed in such a state as to project outwardly near the outermost array of light transmissive holes but recede inwardly near the light shielding section constituting a light shielding film LM relative to the outermost array of the light transmissive holes. Therefore, there is a risk that the liquid crystal alignment will be disturbed.

According to the photomask MK of the sixth modification, the light transmissive holes situated at the outermost side, here, the outermost-arrayed circular holes RH', are greater than the inside circular holes RH and, therefore, the outer edge of an opening HT is approached in a linear way whereby it is possible to reduce a liquid crystal alignment failure. The same thing can also be true of the case where the light transmissive hole is rectangular in shape.

The present invention is not restricted to the above-mentioned embodiments and various changes or modifications of the present invention can be made without departing from the essence of the present invention.

Figure 20:
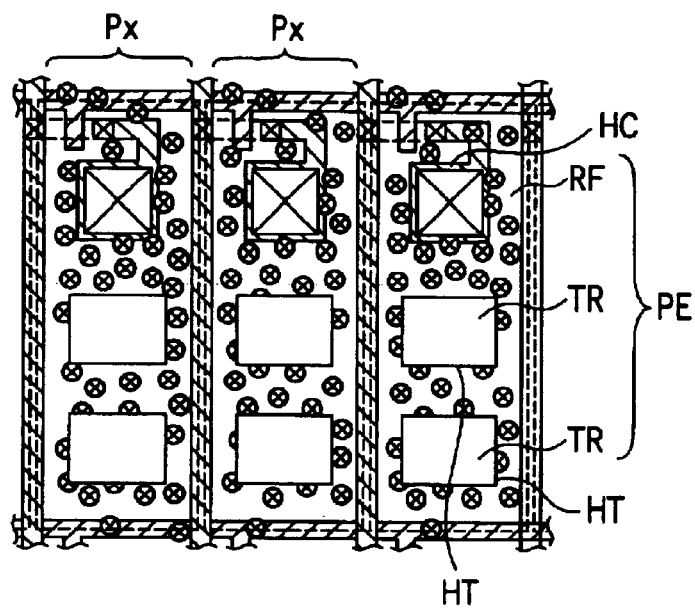
FIG. 20 is a view showing a modification of the planar structure of the portion including the pixel shown in FIG. 2.
Figure 21:
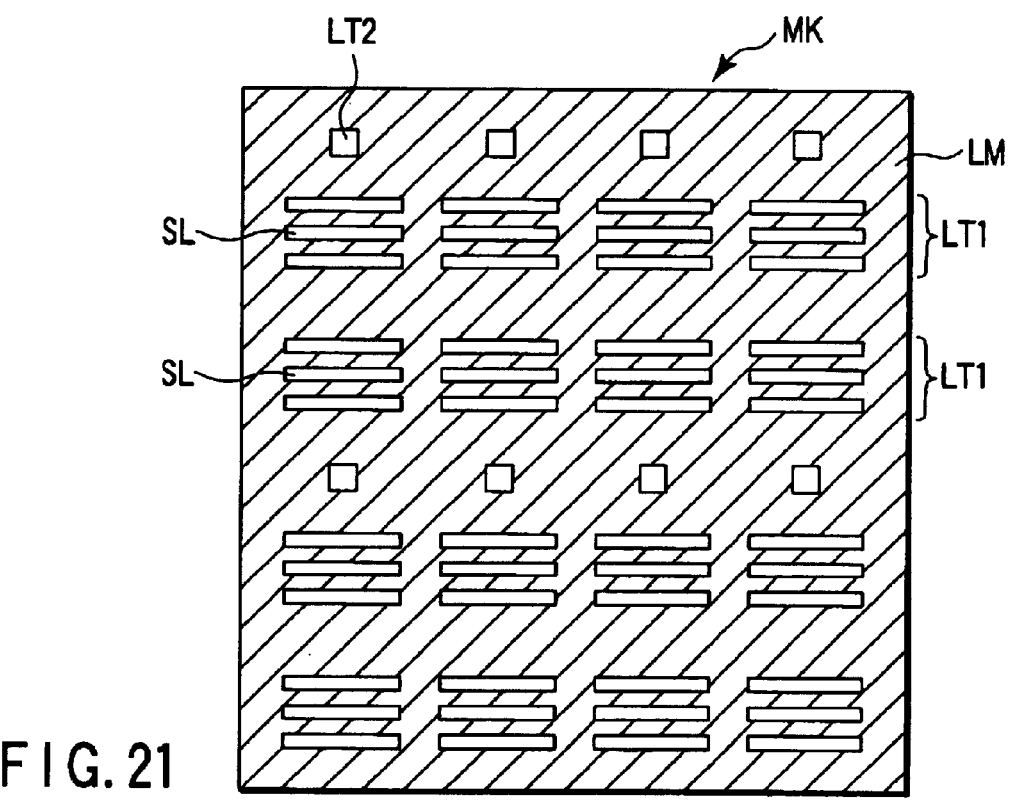
FIG. 21 is a view showing a practical planar pattern of a photomask suitable to the modification shown in FIG. 20.
Figure 22:
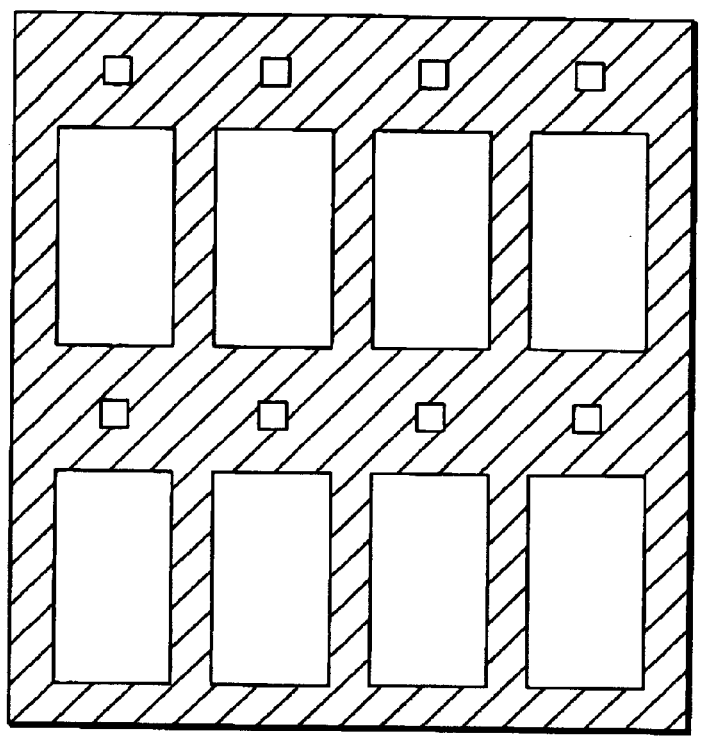
FIG. 22 is a view showing a planar pattern of a photomask for use in a light exposure process of forming a plurality of openings of different sizes in an organic insulating film.
Figure 23:
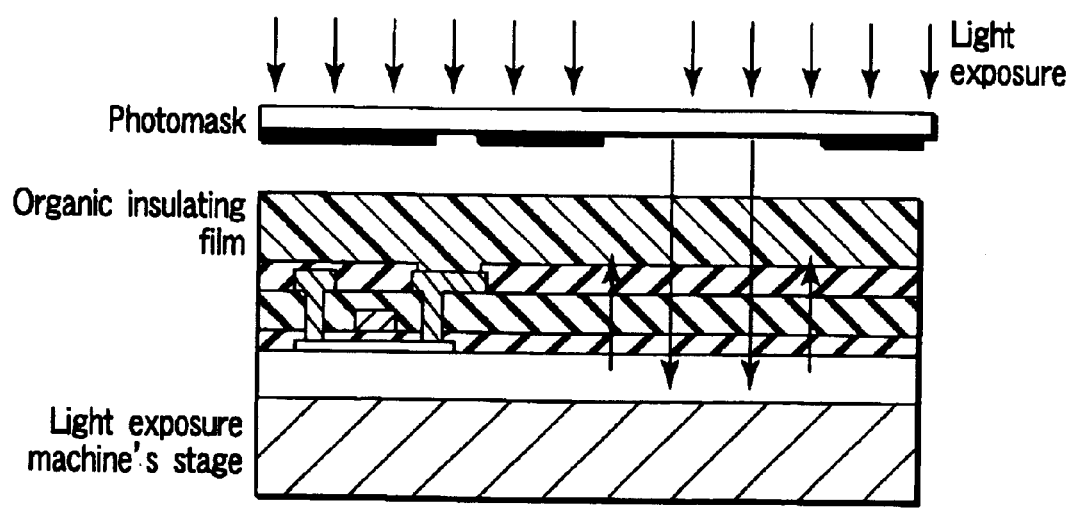
FIG. 23 is a view showing light applied in a light exposure process using the photomask shown in FIG. 22 and reflected on a surface portion of a light exposure machine's stage where no pin insertion hole or vacuum hole exists.
Figure 24:
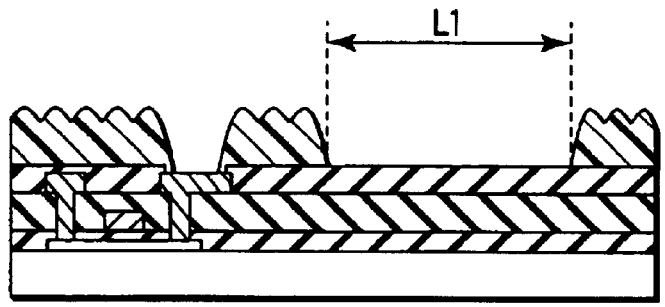
FIG. 24 is a view showing a size of an opening obtained as a result of light reflection on the surface of the light exposure machine's stage shown in FIG. 23.
Figure 25:
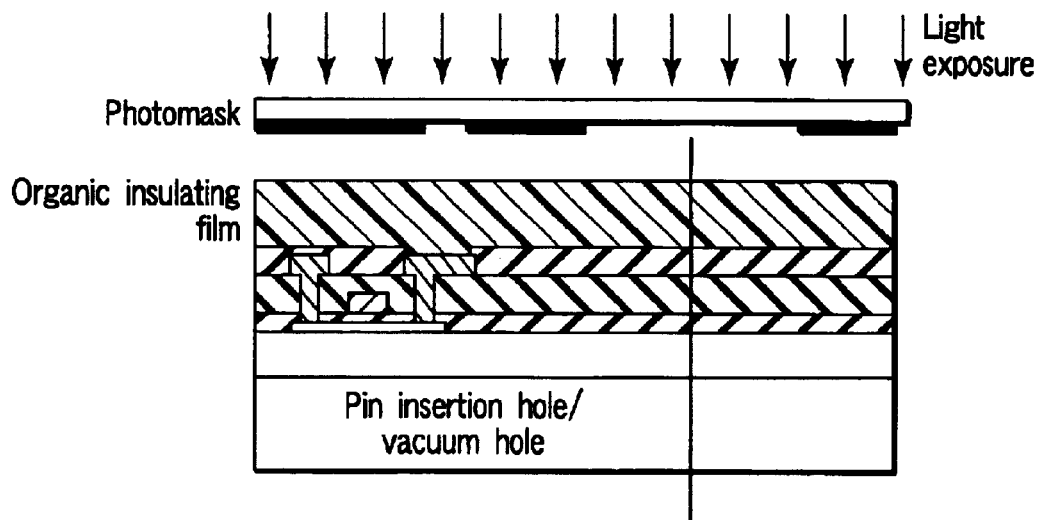
FIG. 25 is a view showing light applied in the light exposure process using the photomask shown in FIG. 22 and transmitting past a surface portion of the light exposure machine's stage, without any reflection, where a pin insertion hole or vacuum hole exists.
Figure 26:
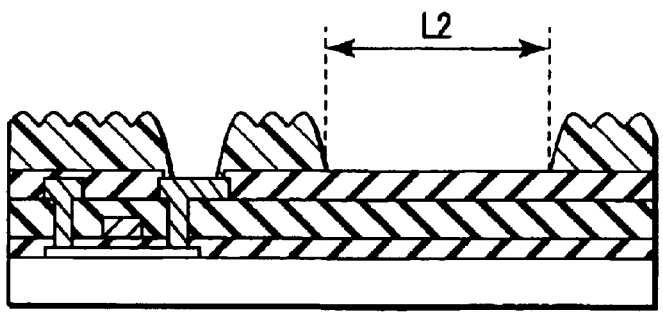
FIG. 26 is a view showing a size of an opening obtained as a result of light transmission past the surface of the light exposure machine's stage shown in FIG. 25.

Although the modifications shown in FIGS. 14 to 19 have been explained as providing the single transmissive electrode section TR relative to the pixel electrode PE either as shown in FIG. 2, this can also be applied even to the case where a plurality of transmissive electrode sections TR are provided relative to the pixel electrode PE as shown in FIG. 20. In this case, a photomask MK as shown, for example, in FIG. 21 is used to form a plurality of openings HT for holding these transmissive electrode sections TR. The photomask MK includes a plurality of light transmissive holes uniformly arranged in the light transmissive area LT1 for each opening HT and setting the light transmissive area LT1 to have a partially different transmittance. Although these light transmissive holes are comprised of a parallel array of straight slits SL in the light shielding film LM in FIG. 21, they may be formed to have other shapes as explained in connection with the above-mentioned other modifications. Further, a light reducing film ND may be arranged at the respective light transmissive area LT1 as shown in FIG. 8.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method for manufacturing a substrate for a display panel, comprising:

a step of forming an organic insulating film on a light transmissive substrate; and a step of patterning the organic insulating film to form a first opening and a second opening smaller than the first opening as through holes therein, wherein the patterning step comprises a lithography process of selectively exposing the organic insulating film to light with the use of a photomask and removing the light-exposed portions, the photomask being so set that the average light transmittance is lower at a light transmissive area for the first opening than at a light transmissive area for the second opening.

2. A method according to claim 1, wherein the light transmissive area for the first opening is set to have a uniform light transmittance.

3. A method according to claim 1, wherein the light transmissive area for the first opening is set to have a partially different light transmittance.

4. A method according to claim 3, wherein the photomask includes a light shielding film having a plurality of light transmissive holes uniformly arranged in the light transmissive area for the first opening and a single light transmissive hole arranged in the light transmissive area for the second opening.

5. A method according to claim 4, wherein said plurality of light transmissive holes include a parallel array of straight slits.

6. A method according to claim 5, wherein said plurality of light transmissive holes include a single rectangular slit surrounding said plurality of straight slits therewith.

7. A method according to claim 4, wherein said plurality of light transmissive holes, each, are formed as either one of a circular shape and a rectangular shape.

8. A method according to claim 7, wherein said plurality of light transmissive holes are so formed as to be greater at an outermost outline side than at an inner side.

9. A method according to claim 1, further comprising a step of forming, at the light transmissive substrate, a switching element exposed in the second opening and a step of forming a pixel electrode over the light transmissive substrate and organic insulating film exposed in the first opening.

10. A method according to claim 9, wherein the electrode forming step includes a step of forming the light transmissive substrate exposed in the first opening, the switching element exposed in the second opening and a transparent conduction film on the organic insulating film and a step of forming a reflective conduction film covering the transparent conduction film therewith except in the first opening.

11. A method according to claim 10, wherein the patterning step includes the process of forming undulations on the surface of the organic insulating film, wherein reflecting light is scattered by undulations of the reflective conduction film corresponding to those of the organic insulating film.

12. A method according to claim 9, wherein the electrode forming step includes a step of forming the switching element exposed in the second opening and the reflective conduction film on the organic insulating film and a step of forming the transparent conduction film covering the light transmissive substrate exposed in the first opening and overlapping the reflective conduction film.

13. A method according to claim 12, wherein the patterning step includes the process of forming undulations on the surface of the organic insulating film, wherein reflecting light is scattered by undulations of the reflective conduction film corresponding to the undulations of the organic insulating film.

14. A method according to claim 9, wherein the element forming step includes the process of forming an inorganic insulating film as a portion of the light transmissive substrate, the inorganic insulating film covering the switching element therewith except at a portion corresponding to the second opening and serving as an underlying film beneath the organic insulating film.

15. A method according to claim 1, wherein the organic insulating film is formed of a positive type photosensitive resin film.

16. A method according to claim 15, wherein the thickness of the organic insulating film is over 0.5 $\mu$m.

* * * * *